United States Patent
Ezrielev et al.

(10) Patent No.: US 12,536,321 B2
(45) Date of Patent: Jan. 27, 2026

(54) SYSTEM AND METHOD FOR DATA ACCESS MANAGEMENT BASED ON ENVIRONMENTAL RISK ASSESSMENT

(71) Applicant: Dell Products L.P., Round Rock, TX (US)

(72) Inventors: Ofir Ezrielev, Beer Sheva (IL); Naor Radami, Shokeda (IL); Amos Zamir, Beer Sheva (IL)

(73) Assignee: Dell Products L.P., Round Rock, TX (US)

( * ) Notice: Subject to any disclaimer, the term of this patent is extended or adjusted under 35 U.S.C. 154(b) by 288 days.

(21) Appl. No.: 18/175,680

(22) Filed: Feb. 28, 2023

(65) Prior Publication Data

US 2024/0289489 A1     Aug. 29, 2024

(51) Int. Cl.
*G06F 21/62* (2013.01)
*G06F 21/31* (2013.01)
*G06F 21/84* (2013.01)

(52) U.S. Cl.
CPC .......... *G06F 21/6245* (2013.01); *G06F 21/31* (2013.01); *G06F 21/84* (2013.01); *G06F 21/62* (2013.01)

(58) Field of Classification Search
CPC ...... G06F 21/6245; G06F 21/31; G06F 21/84; G06F 21/62
See application file for complete search history.

(56) References Cited

U.S. PATENT DOCUMENTS

| | | | |
|---|---|---|---|
| 11,625,491 B1 * | 4/2023 | Quevedo | G06F 21/602 713/155 |
| 11,831,644 B1 * | 11/2023 | Thakore | G06F 16/2455 |
| 2003/0165240 A1 | 9/2003 | Bantz et al. | |
| 2013/0111219 A1 * | 5/2013 | Avanch | G06F 21/00 713/189 |

(Continued)

OTHER PUBLICATIONS

"Learn about Conditional Access and Intune," Microsoft, Web Page <https://learn.microsoft.com/en-us/mem/intune/protect/conditional-access> accessed on Nov. 2, 2022 (2 Pages).

(Continued)

*Primary Examiner* — Ellen Tran
(74) *Attorney, Agent, or Firm* — WOMBLE BOND DICKINSON (US) LLP

(57) ABSTRACT

Methods and systems for managing access to data stored in data storage systems are disclosed. To prevent malicious parties from gaining access to sensitive data stored in a data storage system, an access control system may be implemented. The access control system may include monitoring of the physical environment and a registration process that assigns cryptographic key pairs to registered combinations of users and devices. When an end device requests sensitive data, the registered user-device combinations may be authenticated using the key pairs generated during registration. To protect sensitive data in the physical environment during access, environmental data (e.g., collected by sensing devices located in the physical environment) may be analyzed using trained inference models that generate predictions regarding the security risk present in environment. Provided the physical environment is secure, the sensitive data may be made accessible to the registered user.

20 Claims, 7 Drawing Sheets

(56) References Cited

U.S. PATENT DOCUMENTS

| | | | | |
|---|---|---|---|---|
| 2018/0365439 A1* | 12/2018 | Milman | ................. | H04L 51/42 |
| 2019/0025813 A1* | 1/2019 | Cella | ................. | G05B 23/0289 |
| 2021/0182439 A1* | 6/2021 | Singh | ................. | G06F 21/6245 |
| 2023/0086968 A1* | 3/2023 | Valkaitis | ............... | H04L 9/0822 |
| | | | | 713/171 |

OTHER PUBLICATIONS

"Common ways to use Conditional Access with Intune," Microsoft, Web Page <https://learn.microsoft.com/en-us/mem/intune/protect/conditional-access-intune-common-ways-use> accessed on Nov. 2, 2022 (6 Pages).

"Create a device-based Conditional Access policy," Microsoft, Web Page <https://learn.microsoft.com/en-us/mem/intune/protect/create-conditional-access-intune> accessed on Nov. 2, 2022 (5 Pages).

"Add Endpoint protection settings in Intune," Microsoft, Web Page <https://learn.microsoft.com/en-us/mem/intune/protect/endpoint-protection-configure> accessed on Nov. 2, 2022 (4 Pages).

"Set up the Certificate Connector for Microsoft Intune to support the DigiCert PKI Platform," Microsoft, Web Page <https://learn.microsoft.com/en-us/mem/intune/protect/certificates-digicert-configure> accessed on Nov. 2, 2022 (12 Pages).

"How Windows uses the Trusted Platform Module," Microsoft, Web Page <https://learn.microsoft.com/en-us/windows/security/information-protection/tpm/how-windows-uses-the-tpm> accessed on Nov. 2, 2022 (13 Pages).

"Application Guard for Office," Microsoft, Web Page <https://support.microsoft.com/en-us/office/application-guard-for-office-9e0fb9c2-ffad-43bf-8ba3-78f785fdba46> accessed on Nov. 2, 2022 (6 Pages).

\* cited by examiner

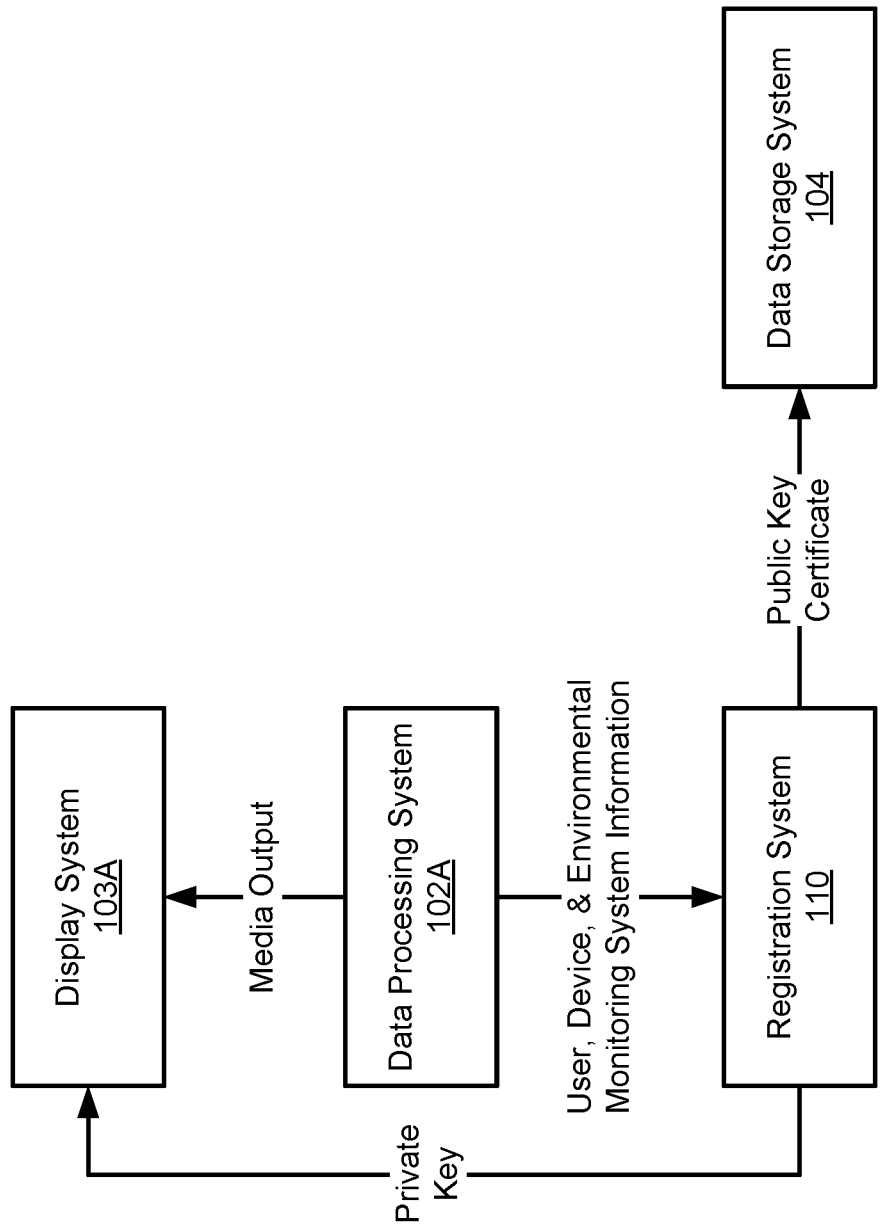

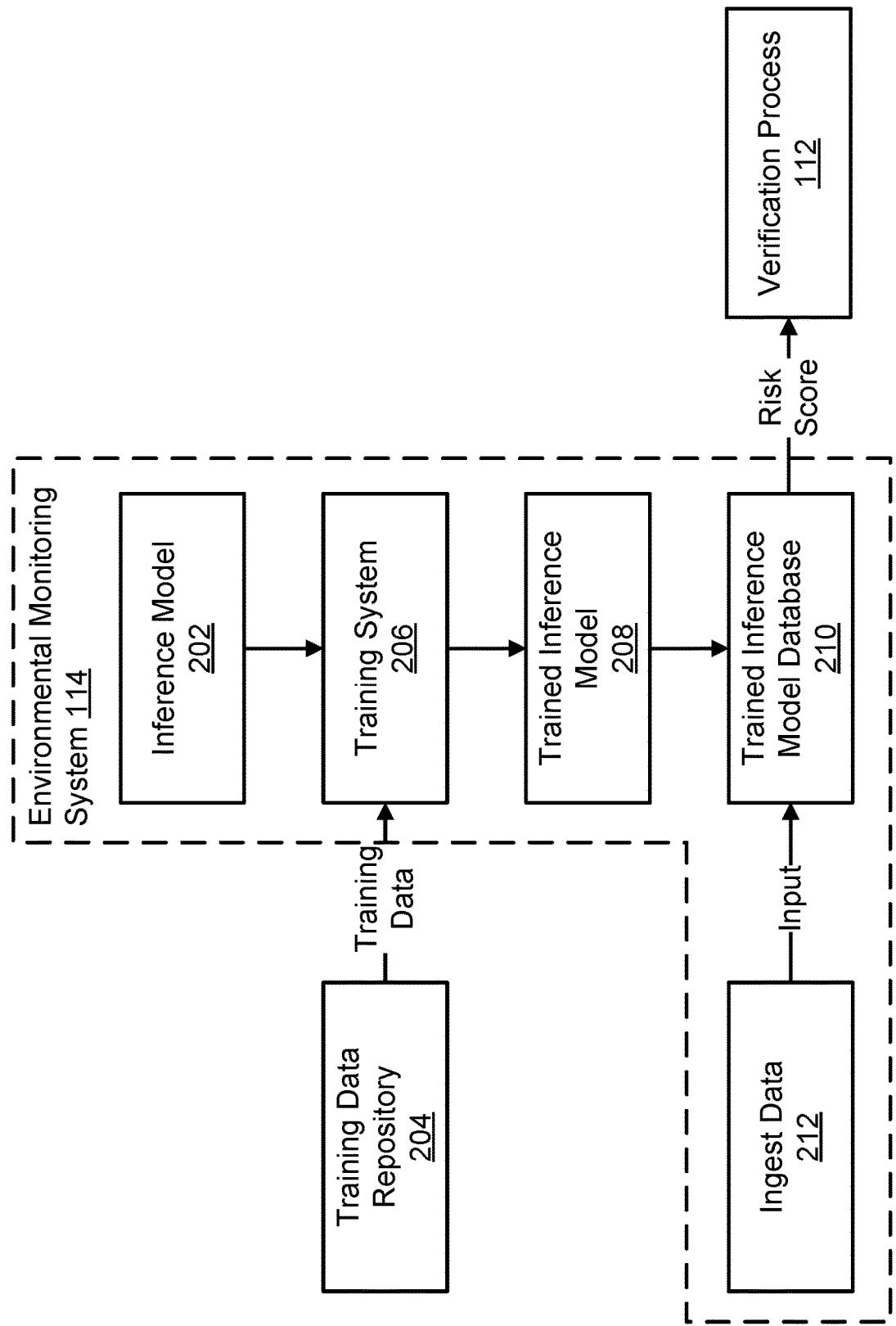

SYSTEM AND METHOD FOR DATA ACCESS MANAGEMENT BASED ON ENVIRONMENTAL RISK ASSESSMENT

FIELD

Embodiments disclosed herein relate generally to data access management. More particularly, embodiments disclosed herein relate to systems and methods to manage secure access to sensitive data.

BACKGROUND

Computing devices may provide computer implemented services. The computer implemented services may be used by users of the computing devices and/or devices operably connected to the computing devices. Computing devices may utilize sensitive data when providing computer implemented services. Computer security measures may be implemented to protect sensitive data while performing the computer implemented services.

BRIEF DESCRIPTION OF THE DRAWINGS

Embodiments disclosed herein are illustrated by way of example and not limitation in the figures of the accompanying drawings in which like references indicate similar elements.

FIG. 2A shows a data flow diagram illustrating a security registration process in accordance with an embodiment.

FIG. 2B shows a data flow diagram illustrating a process for obtaining a trained inference model in accordance with an embodiment.

DETAILED DESCRIPTION

Figure 1:
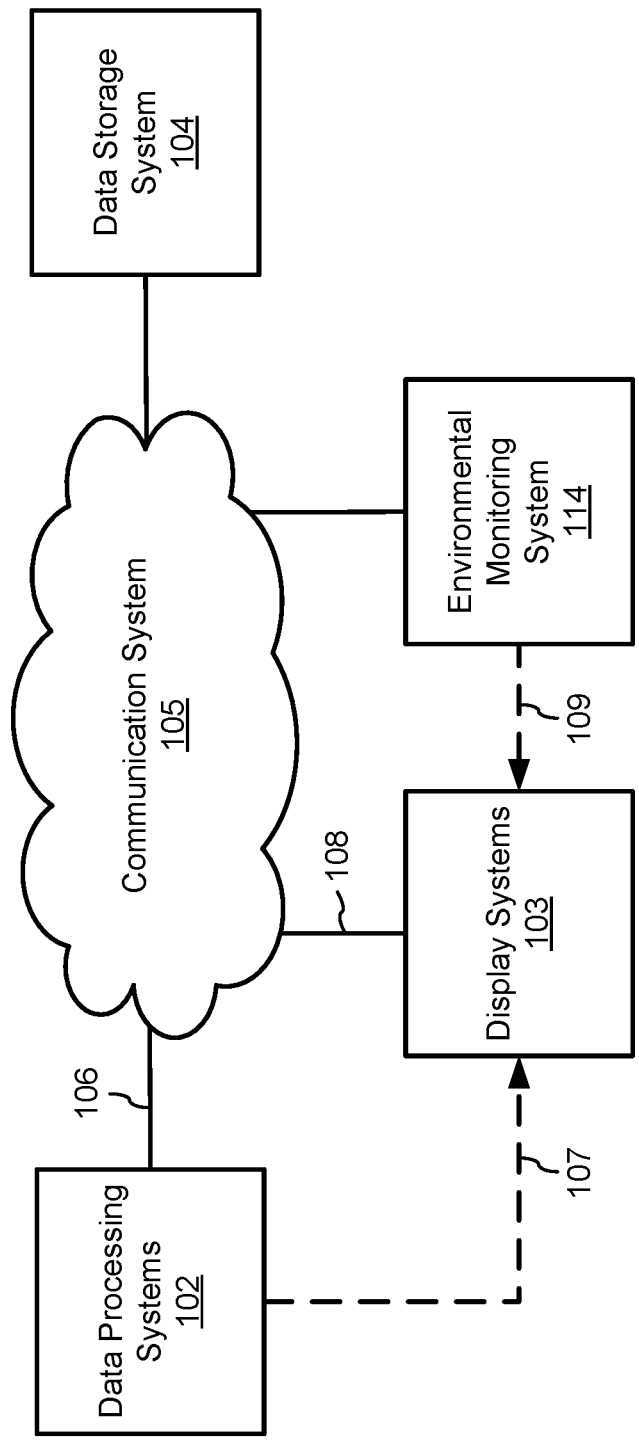
FIG. 1 shows a block diagram illustrating a distributed system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for managing access to data stored in a data storage system. A data storage system may be used to store sensitive data, to which malicious parties may attempt to gain access. The security of this sensitive data may depend on data security measures (e.g., access control measures) implemented around the data storage system.

For example, access control measures such as user authentication (e.g., username and password combinations) may be implemented. However, a malicious party may gain access to the credentials of an authorized user, allowing the malicious party to gain access to the user's end device and any sensitive data transferred to the end device from data storage.

The malicious party may gain access to sensitive data through virtual methods (e.g., remote access into the end device using the compromised user credentials) and/or through physical methods (e.g., gaining physical access to the end device and using the compromised credentials to gain access). However, a malicious party may gain access to sensitive data without obtaining user credentials. For example, an authorized user may access sensitive data obtained via an approved data access request in an environment (e.g., a public environment). A malicious party present in the environment may be able to gain physical access (e.g., visual access) to the sensitive data while the sensitive data is being made accessible to the authorized user.

To increase the security of sensitive data, additional security access mechanisms may be implemented. The additional mechanisms may include a security registration process for combinations of users and the devices of users (e.g., end devices and/or auxiliary devices associated with end devices), and environmental monitoring devices (e.g., using sensing devices to record environmental data). The recorded environmental data may be analyzed using trained inference models (e.g., machine-learning models) to determine whether parties other than the registered user are present in the environment.

The registration process may assign cryptographic key pairs to registered user-device combinations (e.g., a user, the end device of a user, the display device associated with the end device, and/or sensing device associated with the display device). If a user of an end device with associated display and/or environmental monitoring devices requests sensitive data from the data storage system, the assigned key pairs may be used to authenticate the user-device combination.

In addition to user-device combination authentication, before providing the user with the sensitive data, an environmental check may be performed. Inference models may be used to analyze the environmental data (e.g., recorded by the environmental monitoring system) at given times to generate inferences regarding the security of the environment (e.g., environmental risk scores). The inferences may be used to determine whether the environment is sufficiently secure (e.g., at the given time). Based on the predicted security of the environment, the user may be granted access to the sensitive data, and/or a security access level of the user may be modified (e.g., reduced) to protect portions of the sensitive data in unsecured environments (e.g., sensitive data being leaked to unauthorized parties).

However, when the user and end device are validated and the environment is determined to be secured (e.g., the environmental risk score falls within a specified tolerance), the data access request may be granted. Before sensitive data is transferred, the sensitive data may be encrypted using device-specific encryption (e.g., using a key pair established during registration).

The encrypted data may be transmitted to the display device where an independent decryption process may be initiated by the user. The decryption process may be performed using a key stored on the display device (e.g., established during registration), thereby protecting the sensitive data from a malicious party that may gain access to the end device. The decryption process may be performed provided the environment remains secure (e.g., via real-time environmental risk score analysis); otherwise, the decryption process may be prevented, or the sensitive data may be rendered inaccessible.

By doing so, an improved computing device and/or distributed system may be obtained. The improved device and/or system may prevent malicious parties from accessing sensitive data required to provide the computer implemented services.

In an embodiment, a computer implemented method for managing access to data stored in a data storage system is provided. The method may include: obtaining a data access request for a portion of the data, the data access request being from a user located in an environment, and the data access request being obtained from a requesting device, the requesting device being used by the user; and, making a first determination regarding whether the requesting device and the user can be validated and that the portion of data comprises sensitive data.

In a first instance of the first determination where both the requesting device and the user are validated, and the portion of the data comprises the sensitive data, the method may also include: obtaining environmental data based on activity in the environment, the environment being monitored by an environmental monitoring system; ingesting the environmental data into a trained inference model to obtain an inference, the inference indicating a likelihood of the sensitive data being compromised due to the activity in the environment; and, making a second determination regarding whether the likelihood exceeds a risk threshold.

In a first instance of the second determination where the likelihood does not exceed the risk threshold, the method may also include securely providing access to at least the sensitive data to the user.

Obtaining the environmental data may include collecting environmental data using sensing devices of the environmental monitoring system, the environmental data including a type of data selected from a group of types of data consisting of audio data, video data, thermal data, and electromagnetic data.

Obtaining the environmental data may further include performing a verification procedure for a first sensing device of the environmental monitoring system, the verification procedure indicating whether the first sensing device is performing above an operational parameter.

In a first instance of the verification procedure where the first sensing device is not performing above the operation parameter, the method may include selecting, based on a degree of lack of performance by the first sensing device, an action to obtain the inference.

When the degree of lack of performance exceeds a first threshold, the action may include utilizing a second sensing device to collect environmental data for ingestion to a second trained inference model.

When the degree of lack of performance exceeds a second threshold and does not exceed the first threshold, the action may include selecting the trained inference model to generate the inference, the trained inference model being trained to compensate for the degree of lack of performance.

The trained inference model may be trained, using previously collected environmental data, to generate attribution scores regarding the inference, and the inference may include a risk score.

The attribution scores may indicate a level of dependence of the inference on different portions of information regarding the activity in the environment that are ingested into the trained inference model to obtain the inference.

The activity in the environment may include at least one of presence of an unauthorized person in a portion of the environment monitored by the sensing devices, and absence of the user in the portion of the environment.

The environmental monitoring system may use the sensing devices to record the environmental data, and the sensing devices may include at least one sensing device selected from a group of sensing devices consisting of a camera, a microphone, and a proximity sensor.

The method may further include, after the at least the sensitive data has been accessed by the user, ingesting into the trained inference model, a second environmental data based on new activity in the environment to obtain a second inference, the second inference indicating a second likelihood of the sensitive data being compromised due to the new activity in the environment.

In a first instance of the second inference where the second likelihood exceeds the risk threshold, the method may include performing an obfuscation operation rendering the sensitive data temporarily inaccessible.

Performing the obfuscation operation may include disabling a display device that is displaying the sensitive data.

In a second instance of the second determination where the likelihood exceeds the risk threshold, the method may further include modifying an access level of the user to reduce risk of unauthorized disclosure of the sensitive data; and, preventing, based on the modified access level, access to at least a portion of the sensitive data while the access level remains modified.

The method may further include, prior to obtaining the data access request, performing a registration process for the user, the requesting device, a display device associated with the requesting device, and the environmental monitoring system with respect to the data storage system, the registration process obtaining a first key pair and distributing portions of the first key pair to the display device and the data storage system.

In a second instance of the first determination where both the requesting device and the user are validated, and the portion of the data comprises insensitive data, the method may further include providing the portion of the data to the requesting device.

In an embodiment, a non-transitory media is provided. The non-transitory media may include instructions that when executed by a processor cause the computer implemented method to be performed.

In an embodiment, a data processing system is provided. The data processing system may include the non-transitory media and a processor, and may perform the computer implemented method when the computer instructions are executed by the process.

Turning to FIG. 1, a block diagram illustrating a distributed system in accordance with an embodiment is shown. The system shown in FIG. 1 may provide computer implemented services. The system may include data processing systems 102, display systems 103, and data storage system 104. Data processing systems 102 may include any number of computing devices that may independently and/or cooperatively provide the computer implemented services.

For example, all, or a portion, of data processing systems 102 may provide computer implemented services to users and/or other computing devices operably connected to data processing systems 102. The computer implemented services may include any type and quantity of services including, for example, database services, instant messaging services, video conferencing services, etc. Different systems may provide similar and/or different computer implemented services.

To provide the computer implemented services, data processing systems 102 may host applications that provide these (and/or other) computer implemented services. The applications may be hosted by one or more of data processing systems 102. One or more of data processing systems 102 may access data stored in data storage system 104 (e.g., via operable connection 106) and/or display accessed data on display systems 103 in order to provide all or a portion of the computer implemented services.

Display systems 103 may include any number of auxiliary devices operably connected to one or more of data processing systems 102. Display systems 103 may include a data processing system that operates independently from data processing systems 102. For example, the auxiliary devices may output data in a visual and/or tactile form if implemented using monitors, mobile displays, projectors, etc., and/or provide other types of functions if implemented using other types of auxiliary devices such as printers, keyboards, mice, etc. . . .

Any of display systems 103 may independently and/or cooperatively display data received through an operable connection to another device. For example, a display system of display systems 103 may display information received from any of data processing systems 102 via operable connection 107.

Display systems 103 may receive data (e.g., environmental data) from environmental monitoring system 114. For example, environmental monitoring system 114 may be operably connected to display systems 103 via operable connection 109. Environmental monitoring system 114 may collect environmental data such as audio data, video data, and/or thermal data, using one or more sensing devices (e.g., microphones, cameras, proximity sensors). Environmental monitoring system 114 may operate as part of display systems 103 and/or may operate independently from display systems 103 (e.g., as one or more peripheral devices).

Any of data processing systems 102 and components thereof, as well as hosted entities (e.g., applications that provide computer implemented services, other applications that manage the operation of data processing systems 102, etc.), may be subject to attacks performed by malicious parties. For example, a malicious party may gain access to any of data processing systems 102 (e.g., by compromising user credentials, passwords, and/or other type of access control data). If the malicious party gains access to any of data processing systems 102, the malicious party may gain access to data accessible by the data processing systems.

Consequently, if any of data processing systems 102 are able to access data stored in data storage system 104 while compromised, the data stored in data storage system 104 may also be compromised.

Data storage system 104 may store sensitive data and/or insensitive data. Data storage system 104 may obtain data access requests for data (e.g., including sensitive data) from any of data processing systems 102, and may, in turn, provide the requested data to data processing systems 102.

In general, embodiments disclosed herein may provide systems, devices, and methods for managing access to sensitive data by implementing data access security control mechanisms. The access control mechanisms may limit access to data stored in data storage system 104. The access may be limited through (i) environmental checks (e.g., using trained inference models to analyze recorded environmental data), (ii) registration processes, (iii) device-specific encryption of the data, and/or (iv) redirection of data from requesting entities to other entities. By doing so, sensitive data from data storage system 104 that is accessed by a compromised data processing system may be less likely to be divulged to malicious parties by virtue of the data access limiting framework implemented by the system.

To provide its functionality, data storage system 104 may implement the registration processes, the environmental checks, the device-specific encryption, and/or redirection of data from requesting entities to other associated entities.

To perform the registration processes, data storage system 104 may (i) receive user identification and/or device identification information (e.g., from a data processing system) thereby establishing a registered quadruple including a user, an end device, one or more associated auxiliary devices, such as a display device and/or a sensing device (e.g., a registered user-device combination), and an environmental monitoring system that may monitor an environment in which the display device and/or end device is positioned, (ii) obtain cryptographic key pairs based on the user identification and device identification information (e.g., for each user-device combination), (iii) generate certificates (e.g., public key certificates for the validation of devices and/or systems), and/or (iv) provide the key pairs and/or certificates to devices (e.g., to the end device, the display device, and/or the data storage system) that may participate in the data access control system. Refer to FIG. 2A for additional details regarding registration processes.

To perform an environmental check, environmental data may be analyzed (e.g., in real-time). The environmental data may be collected by one or more sensing devices (e.g., of environmental monitoring systems) situated in the environment in which the end device and/or auxiliary devices are used to access the sensitive data.

The collection and/or analysis of environmental data may be performed by environmental monitoring system 114 (e.g., using one or more data processing systems of environmental monitoring system 114). However, threats may be present in an environment even if not clearly visible. For example, presence of a person that is out of view of a camera may present a risk of undesired disclosure if data is displayed on display systems 103.

Rather than attempting to rely on static rules of analysis implemented by a subject matter expert, the collected environmental data may be used to train inference models. The trained inference model may predict the security of the environment (e.g., based on training data regarding historical environmental data with known security outcomes). To do so, trained inference models may ingest data regarding an environment (e.g., real-time environmental data) obtained by environmental monitoring system 114 to generate predictions for current and/or future security outcomes. For example, the analysis of current environmental data by a trained inference model may include predicting a likelihood of sensitive data being compromised when accessed in the current environment. Refer to FIG. 2B for additional details regarding trained inference models.

Once the environmental check has been performed, data storage system 104 may (i) receive a notification regarding the security of an environment (e.g., regarding whether the environment is secure or unsecure), and (ii) when the environment is unsecure, deny an access request, and/or (iii) send a notification to an auxiliary device (e.g., a display device associated with the requesting device) to render the sensitive data inaccessible to the user.

Such environmental checks may be performed as part of device-specific encryption and data redirection. To perform device-specific encryption and data redirection, data storage system 104 may (i) obtain data access requests for data from users of end devices, (ii) perform validations of the user, the end device, an auxiliary device (e.g., a display device used by the user in making the data access request and/or a sensing device of an environmental monitoring system) associated with the end device that originated the access request, (iii) perform validations of the security of the environment through environmental checks, (iv) when all validations are successful, encrypt the requested data (e.g., using a public key of a key pair established during registration of the user, the end device, and the display device), (v) provide the encrypted data to the display device (as opposed to the end device), and/or (vi) deny access requests for users or devices (e.g., one or more of them) that cannot be validated.

Figure 2C:
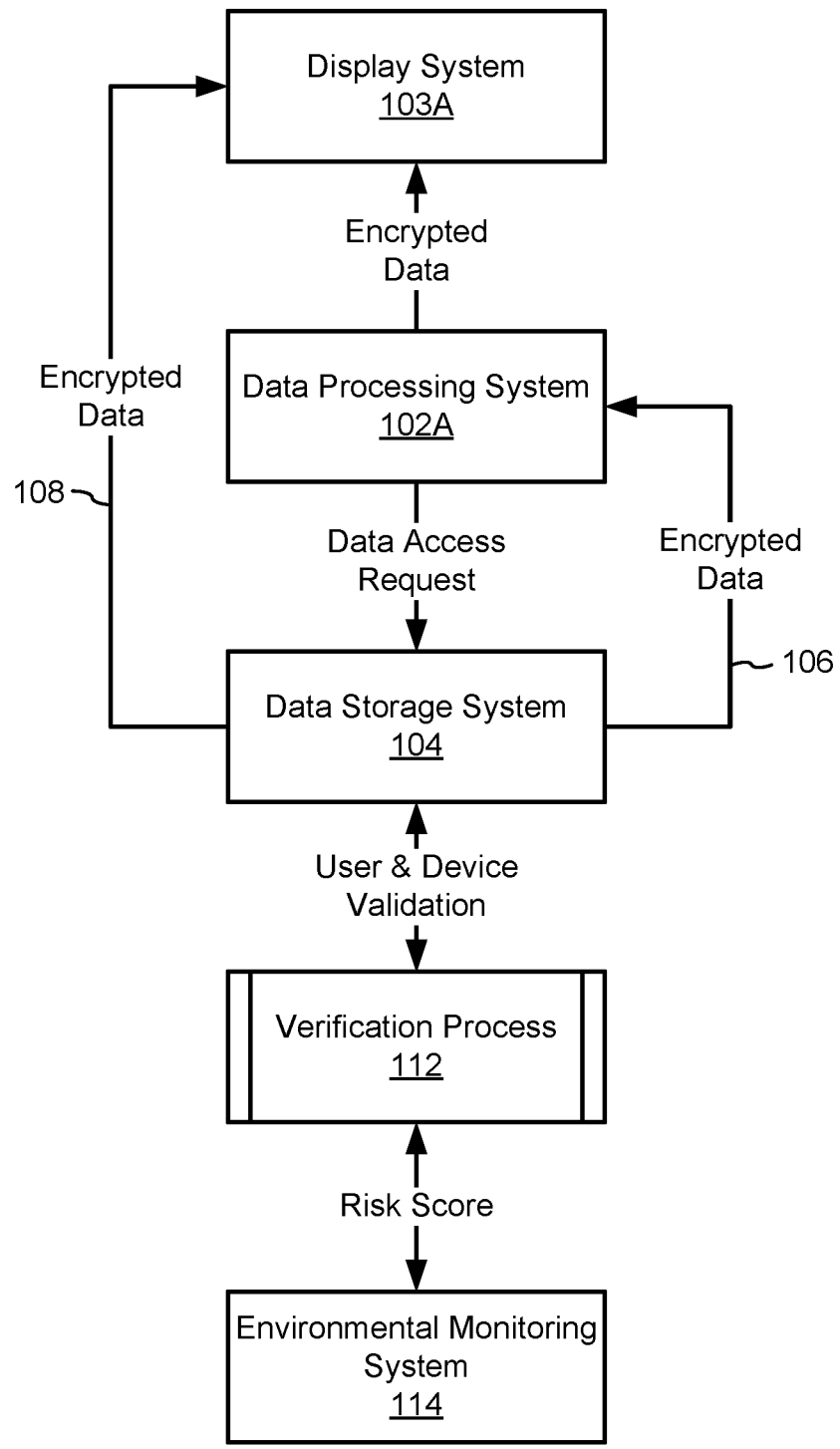
FIG. 2C shows a data flow diagram illustrating a process for managing access to data stored in a data storage system accordance with an embodiment.

For example, a display system of display systems 103 may receive data (e.g., input media) from data storage system 104 through operable connection 108. By providing the sensitive data to display systems 103 directly (e.g., circumventing data processing systems 102), in the event that one or more of data processing systems 102 are compromised (e.g., via spyware and/or malicious party access), the sensitive data may be screened from the malicious party. Refer to FIG. 2C for additional details regarding verification processes, device-specific encryption, and data redirection.

By doing so, a system in accordance with embodiments disclosed herein may provide a method for managing access to sensitive data by reducing and/or preventing access of the data by malicious parties that may leak the data and/or use the data for other purposes.

Figure 3A:
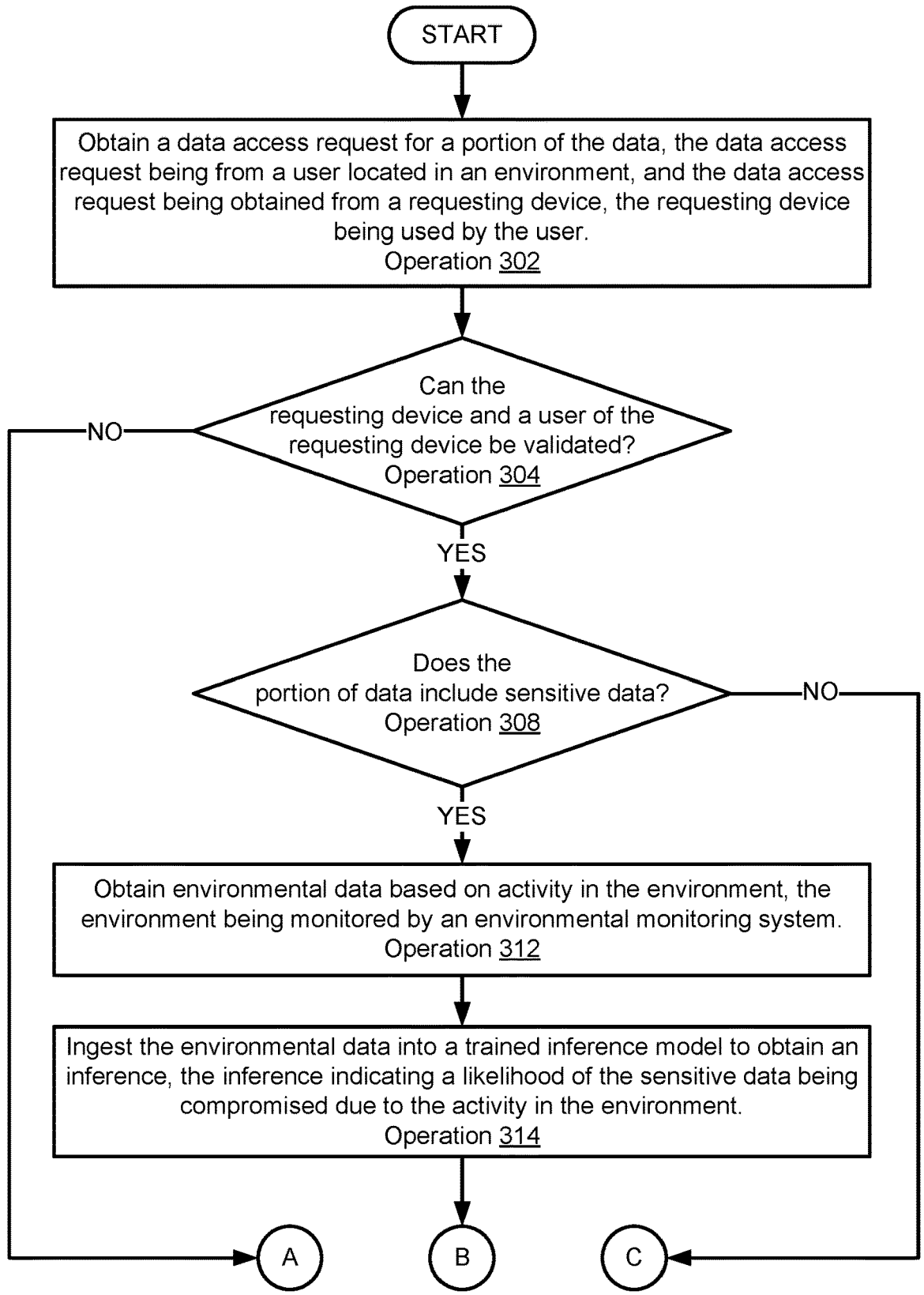
FIGS. 3A-3B show a flow diagram illustrating a method of managing data access in accordance with an embodiment.
Figure 3B:
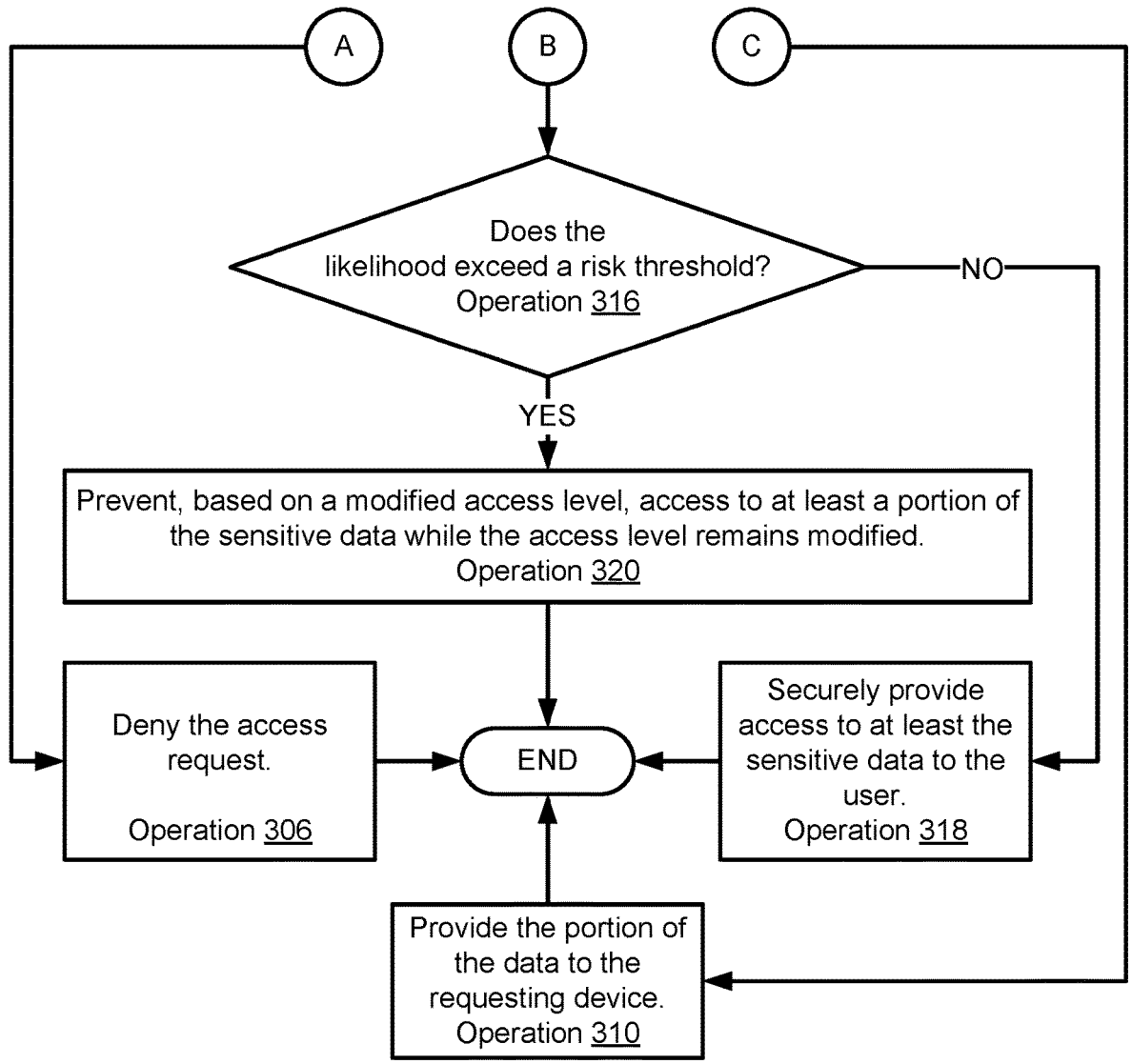

When providing its functionality, data storage system 104 may perform all, or a portion, of the method and/or actions shown in FIGS. 3A-3B.

Data processing systems 102 and/or data storage system 104 may be implemented using a computing device such as a host or server, a personal computer (e.g., desktops, laptops, and tablets), a "thin" client, a personal digital assistant (PDA), a Web enabled appliance, or a mobile phone (e.g., Smartphone), an embedded system, local controllers, and/or any other type of data processing device or system. For additional details regarding computing devices, refer to FIG. 4.

Any of the components illustrated in FIG. 1 may be operably connected to each other (and/or components not illustrated) with a communication system 105. In an embodiment, communication system 105 includes one or more networks that facilitate communication between any number of components. The networks may include wired networks and/or wireless networks (e.g., and/or the Internet). The networks may operate in accordance with any number and types of communication protocols (e.g., such as the internet protocol).

While illustrated in FIG. 1 as included a limited number of specific components, a system in accordance with an embodiment may include fewer, additional, and/or different components than those illustrated therein.

To further clarify aspects of the disclosed embodiments, data flow diagrams are shown in FIGS. 2A-2C.

Turning to FIG. 2A, a first data flow diagram in accordance with an embodiment is shown. The data flow diagram may illustrate a security registration process performed by a system similar to that of FIG. 1. The security registration process may register, using a registration system, combinations of (i) a user (e.g., through recording user information), (ii) an end device (e.g., through recording end device information), (iii) a display device (e.g., an auxiliary device) associated with the end device (e.g., through recording display device information), and/or (iv) a sensing device of an environmental monitoring system (e.g., through recording sensing device information).

To do so, data processing system 102A of data processing systems 102 may provide registration system 110 with information regarding authorized users and/or devices (e.g., end devices, display devices, and/or sensing devices). For example, an auxiliary device such as display system 103A may be associated with (e.g., operably connected to) data processing system 102A and may receive media output for display from data processing system 102A. A sensing device (not shown) may be associated with (e.g., operably connected to or included as part of) display system 103A. One or more sensing devices may record data (e.g., audio data, video data, etc.) and may be included in an environmental monitoring system.

Information such as user identifiers (e.g., usernames), security information for the user identifiers (cryptographically secure identifiers), device identifiers (e.g., of an end device and/or display device), and/or environmental monitoring system information (e.g., sensing device identifiers) may be used by registration system 110 to link a cryptographic key pair to a specific combination of registered user and/or associated registered devices (e.g., sensing devices, end devices, and/or display devices).

For example, once a user, a sensing device, an end device, and a display device associated with the end device are registered (e.g., the user and devices may be subject to any number of validation processes during the registration process), one or more key pairs may be generated for and/or be associated with the user-device combination.

Registration system 110 may (i) obtain key pairs and/or certificates from another device, (ii) generate key pairs and/or certificates, (iii) assign key pairs to user-device combinations, (iv) distribute key pairs to systems and/or devices (e.g., data processing system 102A, display system 103A, data storage system 104, and/or a sensing device of an environmental monitoring system (not shown)), and/or (v) facilitate distribution of portions of key pairs. The key pairs may be associated with a user, a device, and/or a combination thereof, and may include a public key and a private key. The key pair associations (e.g., to users and devices) may be retained by registration system 110.

For example, during registration of data processing system 102A, a key pair may be generated, or a portion of a key pair (e.g., a public key) may be provided to registration system 110 by data processing system 102A. The public portion of the key pair may be provided as part of a certificate to data storage system 104 (and/or a certificate may be generated using the public portion). The certificate may be signed by a trusted entity (e.g., registration system 110).

Registration system 110 may be a part of data storage system 104 and/or may operate independently (e.g., may be a third-party registration system) from data storage system 104. Registration system 110 may distribute (e.g., transfer over an encrypted channel) a portion of the generated key pair (e.g., the public key) to data storage system 104, where the portion of the key pair may be stored. Another portion of the key pair (e.g., the private key) may be distributed securely to a registered display device (e.g., display system 103A) that is associated with a registered end device (e.g., data processing system 102A), a registered user (e.g., a user of data processing system 102A), and a registered sensing device. The private key may then be stored on the registered display device, and the key pair may be used to encrypt and/or decrypt data transferred between data storage system 104 and the registered display device (e.g., display system 103A).

Any number of key pairs may be obtained, generated, and/or distributed for any number of user/end device combinations during the registration process. For example, registration system 110 may distribute the public key of a key pair to data storage system 104 and may provide the private key to data processing system 102A. This key pair may be used to in a validation process between data storage system 104 and data processing system 102A (e.g., to validate data access requests received by data storage system 104 from data processing system 102A).

Thus, as illustrated in FIG. 2A, the system of FIG. 1 may perform a security registration process that provides key pairs for user-device combinations (e.g., quadruples). As a function of virtual access control, the key pairs may be used to authenticate and/or validate registered systems, and encrypt sensitive data requested by registered users of the systems. To validate the security of the physical environment, trained inference models may be implemented to determine the environmental risk (e.g., the risk of sensitive data being compromised when accessed in the environment), based on activity in the environment.

Turning to FIG. 2B, a second data flow diagram in accordance with an embodiment is shown. The data flow diagram may illustrate a process for obtaining a trained inference model usable to ascertain security of an environment. The inference model may be generated by a system similar to that of FIG. 1.

An inference model may provide computer implemented services (e.g., inference generation) for downstream consumers and/or systems (e.g., environmental monitoring system 114). A data processing system (e.g., of environmental monitoring system 114) may, over time, generate inference models for various purposes. For example, inference models may generate inferences that may be used to recognize patterns, automate tasks, and/or make decisions. The inference models may, for example, be implemented with artificial neural networks, decision trees, support-vector machines, regression analysis, Bayesian networks, genetic algorithms, and/or any other type of model usable for learning purposes.

The type of inference model used may depend on the goals of the downstream consumers and/or other factors such as (i) training dataset characteristics (e.g., data type, size and/or complexity), (ii) cost limitations (e.g., the cost to train and/or maintain the inference model), (iii) time limitations (e.g., the time to train the inference model and/or for inference generation), (iv) inference characteristics (e.g., accuracy and/or inference type), and/or (v) inference model type characteristics (e.g., explainability and/or interpretability).

For example, a complex inference model such as a multi-layered neural network may process a large amount of complex data and generate highly accurate inferences, but may be costly to train and maintain and may have low interpretability and/or explainability (e.g., may act as a "black box"). In contrast, a linear regression model may be a simpler, less costly inference model with high interpretability and/or explainability, but may only be well-suited for data whose labels are linearly correlated with the selected features and may generate less accurate inferences than a neural network.

Once an inference model type is selected, the inference model may be trained. As shown in FIG. 2B, environmental monitoring system 114 may obtain (untrained) inference model 202. Inference model 202 may be trained using training data (e.g., from training repository 204). The training data may be acquired from various data sources (e.g., one or more sensing devices of one or more environmental monitoring systems for which security states of environments are known).

Training data may include previously collected (e.g., recorded) environmental data from any number of different environments, using any number and/or type of sensing devices. For example, the previously collected environmental data may include audio data, video data, thermal, data, and/or electromagnetic data. The collected environmental data may be associated with a label reflecting the security state of the environment when the environmental data was collected. Thus, the training data may include any number of associations between different portions of collected environmental data and security states of the environments.

The labels may be obtained through any process. For example, the labels may be applied by subject matter experts.

The training data may be stored in training data repository 204.

Training data repository 204 may include any number of training datasets. The training datasets may be used to train inference models to generate a prediction (e.g., an inference) regarding the security of an environment (e.g., the likelihood of sensitive data being compromised in the environment) based on ingested data (e.g., previously collected environmental data).

The training data sets may include environmental data collected while using a wide variety of sensing devices. Further, some of the training data sets may be collected while some of the sensing devices were not operating nominally. Thus, inference models capable of inferring the security state of a variety of sensing devices with various levels of impairment of operation may be obtained through training.

Similarly, the training data set may include environmental data collected from different environments. Thus, the resulting trained inference models may be associated with a combination of, for example, types of available data, quality of the available data, and locations from which the environmental data was obtained.

To train inference model 202, inference model 202 and training data from training data repository 204 may be input to training system 206. Training system 206 may employ machine-learning techniques such as supervised learning (e.g., for labeled training data), and/or unsupervised learning (e.g., for unlabeled data) to produce any number of trained inference models, including trained inference model 208. The trained machine-learning models may be implemented using other modalities (e.g., semi-supervised learning, reinforced learning, associative rules, etc.). As part of the training process, the trained inference model may undergo a validation and/or testing step to improve and/or measure the reliability of generated inferences. Any number of inference models may be trained (e.g., using different types and/or quality of training data) using training system 206.

For example, an inference model may be trained using a particular type of training data (e.g., audio data) from training data repository 204. Training system 206 may train an inference model to predict a likelihood of sensitive data being compromised in the environment (e.g., a risk score, security state, etc.) based on the ingestion of new audio data (e.g., real-time audio data). Likewise, training system 206 may train an inference model to generate inferences based on the ingestion of low-quality audio data (e.g., noisy and/or low-gain audio data) that was obtained using a damaged sensing device. Any number of trained inference models used for any purpose relating to the analysis of environmental data may be stored in and/or accessed from trained inference model database 210, including trained inference model 208.

Once trained, trained inference model 208 may attempt to map an input dataset (e.g., from ingest data 212) to a desired output dataset (e.g., generate inferences). The inferences may be generated from input data that may differ from the training data that was used to train trained inference model 208. For example, trained inference model 208 may be used to analyze new environmental data (e.g., real-time environmental data) recorded by a sensing device of environmental monitoring system 114.

Over time, the trained inference models stored in trained inference model database 210 may need to be updated for a variety of reasons. For example, the trained inference models may become inaccurate, may not provide desired types of inferences, etc. Consequently, trained inference models (e.g., trained inference model 208) may be periodically replaced and/or updated.

As shown in FIG. 2B, ingest data 212 may be input to a trained inference model from trained inference model database 210. The trained inference model selected from trained inference model database 210 may be selected based on information describing the input (e.g., ingest data 212), such as (i) data type (e.g., audio data, video data, thermal data, etc.), (ii) data quality or condition of the sensing devices used to obtain the environmental data, and/or (iii) environment description (e.g., a train station, a coffee shop, private office, etc.).

For example, trained inference model 208 may be trained to generate an inference using high-quality video data for a busy train station. The trained inference model may generate an inference regarding the security of the train station, which may include a risk score (e.g., an environmental risk score) and/or an associated cause of the risk score (e.g., too many persons present within a proximity threshold of the display device).

A trained inference model may be interpreted (e.g., using an interpretation framework) to develop cause-and-effect relationships between input features (e.g., of the ingest dataset ingested into the trained inference model) and the generated output (e.g., the inference). For example, a feature attribution method may be implemented to generate attribution scores based on a trained inference model. The attribution scores may indicate the level of contribution of each input feature of ingest data (e.g., training data) to the prediction.

To obtain attribution scores, a trained inference model may be interpreted using an interpretation framework. Relationships between environmental data and risk scores (e.g., defined by the architecture and parameters of trained inference model 208) may be interpreted using the inference model interpretation framework. The inference model interpretation framework may perform local feature attribution using various methods (e.g., SHapley Additive explanations, Gradient-weighted Class Activation Mapping, etc.). The feature attribution method may output the relevance (e.g., contribution) of each input feature of the inference model to an output feature (e.g., an inference generated by the inference model).

For example, local feature attribution performed on trained inference model 208 may output an attribution score for every risk score associated an input dataset of ingest data 212. The attribution scores may be used to identify the input features (e.g., portions of information regarding the activity in the environment) that most impact the risk score predicted by trained inference model 208, least impacted the risk score, etc. . . .

For example, consider a scenario where audio and visual data in a coffee shop are collected. While no persons are visible in the video, the audio may include significant chatter from a nearby party. An inference model, upon ingestion of the environmental data, may indicate that there is a high level of risk in the environment. The interpretive framework, in this scenario, may indicate that the audio component contributed more significantly to the high level of inferred risk in the environment than the video. Consequently, if access to data is denied, the interpretation may be presented to a requestor of the data so that the requestor may move to an environment with reduced levels of risk.

The inferences generated by trained inference models (e.g., risk scores and/or attributions scores) may be provided to verification process 112 (e.g., in real-time). The inferences may be used to control user access to sensitive data in particular environments during specified periods of time (e.g., based on an analysis of the inferences).

Thus, as illustrated in FIG. 2B, the system of FIG. 1 may obtain and/or train inference models used for the prediction of risk scores based on environmental data collected by sensing devices of environmental monitoring systems. In addition, attribution scores may be generated to apply causality to the risk scores. The predicted risk scores and/or attribution scores may be used to control access to sensitive data (e.g., by modifying user access levels) and/or alert the user to particular activities in the environment that may prevent and/or reduce access to the sensitive data.

Turning to FIG. 2C, a third data flow diagram in accordance with an embodiment is shown. The data flow diagram may illustrate a process for managing access to data stored in a data storage system.

In order to access data from data storage system 104, data processing system 102A may send a data access request to data storage system 104. The request may be for a portion of data, which may include sensitive data. The data access request may include information regarding (i) the requesting end device (e.g., data processing system 102A), (ii) the user of the requesting device, (iii) the display device associated with the end device, (iv) the sensing device associated with the display device, and/or (v) the portion of requested data. The data access request may be encrypted using a private key of a key pair assigned during registration of the user-device combination (e.g., the user, the end device, the sensing device, and the display device).

When the access request is received, data storage system 104 may initiate verification process 112 based on the information from the data access request. Verification process 112 may be performed by data storage system 104 and/or may be performed independently of data storage system 104 (e.g., by another device acting as an agent for data storage system 104).

Verification process 112 may include (i) attempting to validate the requesting device, (ii) attempting to validate the requesting user, and/or (iii) determining whether the user-device pair (e.g., data processing system 102A and a user thereof) can be authenticated based on the outcomes of the validation attempts. To attempt to validate the user, access credentials (e.g., passwords, other data usable to validate a user on a domain or other type of user-based computing environment) for the user may be used to ascertain whether the user is valid. For example, the combination of the username and access credentials may be forwarded to a domain controller for review, or may be otherwise used to attempt to validate the user.

To attempt to validate the requesting device, the encrypted access request may be attempted to be decrypted using the public key from the certificate (e.g., established during registration). If the decryption is successful, then the requesting device may be considered to have been validated (e.g., since only the requesting device should have access to the corresponding private key).

Once the requesting device and user are validated, verification process 112 may verify that (i) a display device associated with the requesting device (e.g., display system 103A), and/or (ii) a sensing device associated with the display device (e.g., a sensing device of environmental monitoring system 114) are registered and associated with the user and the requesting device. Verification process 112 may also use information from environmental monitoring system 114 (e.g., results of an environmental check) to validate the security of the data access environment.

Environmental monitoring system 114 may perform an environmental check by (i) collecting environmental data using any number of sensing devices, (ii) implementing trained inference models to analyze the collected environmental data (e.g., to generate inferences regarding the security of the environment), and/or (iii) analyzing and/or providing the inferences to verification process 112 for further analysis. The inferences (e.g., risk scores) may describe the security of the environment (e.g., the presence of an unauthorized and/or malicious party) in which the display device is located at a given time. The risk score may be represented as a probability or likelihood of being secure (or unsecure).

The inferences may be used in verification process 112 to validate the environment of the display device (e.g., based on the risk score), and may affect the transfer of sensitive data from data storage system 104 (e.g., access to sensitive data may be approved, denied and/or limited). For example, the risk score received by verification process 112 may be compared to a risk threshold to determine whether a security access level of the user should be modified (e.g., modified to zero access, partial access and/or full access). Based on the comparison of the risk score and the risk threshold the security access level may be reduced (or restored).

The user may receive a notification from verification process 112 (e.g., the notification may be sent to data processing system 102A) regarding a modified security access level. The notification may include a description of the modification and/or a reason for the modification. The modification reason may be based on attribution scores associated with the risk score (e.g., indicating a particular security risk). Providing the user with the modification reason may allow the user to perform a remedial action to reduce and/or remove the particular security risk.

The risk score (and associated attribution scores) may be valid for a given time period (e.g., as activity in the monitored environment changes over time), thus the security access level of the user may be modified and/or remain modified for any given time period. The security access level of the user may be modified in real-time and/or may be based on the sensitivity level of the requested sensitive data.

Accordingly, if a malicious party is physically present in the environment where highly sensitive data is intended to be viewed (e.g., based on the analysis of environmental data recorded by the sensing device), the sensitive data access request may be denied, preventing the malicious party from gaining access (e.g., over the shoulder of the authorized user) to the sensitive data.

In the event that both the user-device pair is validated and the environment is secure, the portion of data may be prepared for transfer to the verified display device (e.g., display system 103A). If the portion of requested data includes sensitive data, the sensitive data may be encrypted. For example, the sensitive data may be encrypted by data storage system 104 using a public key of display system 103A (e.g., from the certificate established during registration). The requested data (e.g., with sensitive data being encrypted) may be transferred over a secure channel using a security protocol (e.g., mutual transport layer security) to data processing system 102A (e.g., via operable connection 106). Data processing system 102A may then transfer the requested data to display system 103A. Alternatively, the requested data may be transferred from data storage system 104 to display system 103A directly, bypassing the requesting device (e.g., data processing system 102A) via operable connection 108.

Thus, when received by one of data processing system 102A and/or display system 103A, the sensitive data may be encrypted and may not be accessible without being decrypted. Accordingly, if a malicious party has compromised data processing system 102A, the malicious party may not be able to access the sensitive data because the private key that may be used to decrypt the sensitive data may be stored on another device (e.g., display system 103A) that the malicious party may not have knowledge of and/or have access to.

The encrypted data may be decrypted by display system 103A using a private key (e.g., established during registration of the user-device combination). The decrypted data may then be accessed (e.g., viewed) on display system 103A by the validated user. While sensitive data is being accessed by an authorized user, environmental monitoring system 114 may continuously collect environmental data (e.g., audio, video, thermal, electromagnetic, etc.) to monitor the security of the environment in real-time.

The environmental data may be analyzed in real-time by environmental monitoring system 114 and/or an independent system used for the analysis of sensing data. The analysis of the sensing data may yield an updated risk score, affecting the user's access to the sensitive data. An updated risk score may be sent to verification process 112, where an environmental security status and/or a user security access level may be updated (e.g., based on the updated risk scores). The update(s) may be provided to data storage system 104, data processing system 102A, and/or directly to display system 103A (e.g., while sensitive data is being accessed by the authorized user).

Based on the update, display system 103A may perform an obfuscation operation to render the sensitive data inaccessible (e.g., the display system may be disabled if the environment is deemed unsecure via real-time analysis of environmental data). Accordingly, if a malicious party enters a secure environment in which sensitive data is being viewed, the sensitive data may be rendered inaccessible (e.g., to the user and the malicious party).

To facilitate real-time environmental monitoring, environmental monitoring system 114 may perform a verification procedure. The verification procedure may include performing a test of the environmental monitoring system to ensure that sensing devices are performing at or above performance standards (e.g., above an operational parameter). For example, the environmental monitoring system may produce one or more test auditory signals to measure the quality of test audio data recorded by microphone. The recorded test audio data may be analyzed as part of the verification procedure to determine whether the microphone is performing within operational parameters (e.g., the quality of the test data may be determined).

When a sensing device is not operating within operational parameters (e.g., suffers from a degree of lack of performance), environmental monitoring system 114 may (i) send a notification (e.g., to the user and/or a system administrator) indicating that the sensing device is performing below one or more operational parameters, (ii) send a notification to verification process 112 indicating that the environment may not be reliably monitored (e.g., prompting verification process 112 to modify a security access level of the user), (iii) use a different sensing device (e.g., that is performing at or above operational parameters) to monitor the environment, and/or (iv) tag the recorded data as low quality (e.g., by storing information regarding quality level in metadata), based on the degree of lack of performance of the sensing device.

Thus, as illustrated in FIG. 2C, the system of FIG. 1 may manage data access requests for sensitive data through verification processes that may validate pre-registered user-device combinations and perform an environmental check (e.g., security check) of the data access environment (e.g., the environment where sensitive data is intended to be viewed). The environmental check may include the generation of risk scores and associated attribution scores (e.g., generated using a trained inference model). Risk scores (e.g., of a current environment) may be used to determine whether sensitive data may be accessed by the user in the current environment. Attribution scores may be used to provide the user with information regarding a denied access request or a reduction in security level access.

As discussed above, the components of FIG. 1 may perform methods to manage access to sensitive data used by data processing systems that provide computer implemented services.

Turning to FIGS. 3A-3B, a flow diagram illustrating a method of managing data access in accordance with an embodiment is shown. The method may be performed by the system of FIG. 1. Any of the operations described with respect to FIGS. 3A-3B may be performed in different orders, skipped, repeated, and/or be performed in a parallel or partially overlapping in time manner.

At operation 302, a data access request for a portion of data may be obtained from a requesting device. The data access request may be obtained, for example, by receiving the data access request from a data processing system. The data access request may be obtained by a data storage system via network communications between the data storage system and the data processing system. The data access request may be received from a user (e.g., a user of the requesting device) located in an environment.

The data access request may include information regarding the requesting device, a user of the requesting device, a display device associated with (e.g., connected to) the requesting device, and a sensing device (e.g., of an environmental monitoring system) associated with the display device. The data access request may be encrypted using a private key of a key pair established during a registration process.

Prior to obtaining the data access request, a registration process for the user, the requesting device, the display device, and the environmental monitoring system (e.g., a sensing device thereof), with respect to the data storage system may be performed. The registration process may register user-device combinations; that is, the devices (e.g., the requesting devices, the display device, and the sensing device) and the user of the devices, in order to establish key pairs.

For example, a first key pair associated with the display device and the data storage device may be obtained by a registration system. Portions of the first key pair may be distributed to each of the display device and the data storage device. The data storage device may receive a public key certificate (e.g., based on the public key of the first key pair) associating the first public key certificate with the requesting device, the display device, the sensing device, and the user.

A second key pair associated with the requesting device, the display device associated with the requesting device, the sensing device associated with the display device, and the user of the requesting device may be generated. Portions of the second key pair may be distributed to each of the requesting device and the data storage system (e.g., the data storage system may receive a second public key certificate based on the second public key of the second key pair). The second public key certificate may be used to facilitate validation of the second public key (e.g., validate the requesting device and/or data access requests received from the requesting device). Refer to the discussion of FIG. 2A for more information regarding the registration process.

At operation 304, a determination may be made regarding whether the requesting device and the user of the requesting device may be validated. The determination may be made by authenticating the user and the device independently (e.g., using the second key pair), as described with respect to FIG. 2C. The authentication of the user may be made using password-based authentication, multi-factor authentication, biometric authentication, and/or endpoint authentication methods (e.g., media access control and/or physical device address verification). The requesting device may be validated by ascertaining whether the access request may be decrypted using the public key (e.g., of the second key pair) in a certificate established during registration of the user-device pair.

If both the user and the requesting device are validated, the method may proceed to operation 308. However, if at least one of the user and the requesting device cannot be validated (e.g., fail to be authenticated), the method may proceed to operation 306.

At operation 306, the data access request may be denied. The data access request may be denied (i) by notifying the user of the requesting device of the denied access request, (ii) by refusing access to the requested portion of data, (iii) by discarding the access request without sending a notification, and/or (iv) via other methods.

The method may end following operation 306.

At operation 308, a determination may be made regarding whether the portion of data includes sensitive data. The determination may be made by obtaining a classification of a sub-portion of the portion of requested data. The classification may describe the level of sensitivity of the sub-portion. The classification of a sub-portion of the requested data may be read from metadata of the sub-portion. The classification may be based on data content, based on data context, based on user judgement, and/or may be generated using an artificial intelligence model trained to identify the level of sensitivity of data or via other methods.

If the portion of data does not include sensitive data, the method may proceed to operation 310. However, if the portion of data includes sensitive data, the method may proceed to operation 312.

At operation 310, the portion of the data may be provided to the requesting device. The portion of the data may be provided to the requesting device by transferring the portion of data through a secure network channel established between the data storage system and the data processing system (e.g., end device). The provided portion may not be encrypted with any key pairs established during registration.

Returning to operation 308, the method may proceed to operation 312 following operation 308 when both the user and the requesting device are validated, and the portion of the data includes sensitive data.

At operation 312, environmental data may be obtained. The environmental data may be based on activity in the environment and may be obtained by recording activity in the environment utilizing one or more sensing devices of an environmental monitoring system. The environmental monitoring system may employ a sensing device (e.g., a camera, a microphone, and/or a proximity sensor) to record activity (e.g., environmental data) in the environment in which the display system is located. For example, the registered display device from Operation 302 may include the sensing device (e.g., a webcam), and/or the display device may be separate from but at least partially in a field of sensing of the sensing device (e.g., in a field of view of the webcam).

The recorded environmental data may include audio data, video data, thermal data, electromagnetic data, and/or any combination thereof (e.g., based on the type of sensing device(s) used). The environmental data may include metadata that describes (i) the quality of the recorded data (e.g., a quality score), (ii) the data type (e.g., based on the sensing device type), (iii) the time period of the recording (e.g., timestamps), (iii) the type of environment in which the data is recorded, and/or (iv) an identifier that relates the recorded data with the sensing device. The environmental data may be analyzed to measure security risks posed by activity in the data access environment.

At operation 314, the environmental data may be ingested into a trained inference model to obtain an inference. The environmental data may be ingested into the trained inference model by feeding the environmental data to the trained inference model (e.g., as input to the trained inference model). The trained inference model may be one of many inference models trained using previously collected environmental data.

The trained inference model may be selected from a trained inference model repository based on the information regarding the environmental data (e.g., data quality, data type, and/or environment type), which may be stored as metadata of the environmental data.

Once the environmental data is ingested into the trained inference model, an inference may be obtained. The inference may include a risk score, which may indicate a likelihood of the sensitive data being compromised due to activity in the environment. The trained inference model may also generate an attribution score regarding the inference (e.g., risk score), where the attribution score indicates a level of dependence of the inference on different portions of information regarding the activity in the environment.

The activity in the environment may include (i) the presence of an unauthorized person (e.g., detected by sensing the proximity of an unauthorized person), and/or (ii) the absence of the authorized user in a portion of the environment (e.g., detected by tracking eye movements of the user). For example, the analysis may include a proximity measurement of an unauthorized person (e.g., the proximity of the unauthorized person to the display device). If the proximity measurement is within a proximity inferior to a minimum proximity, the unauthorized person may be able to gain access to sensitive data being displayed on the display device.

The risk score generated by the trained inference model may indicate that the environment has a high likelihood of being compromised (e.g., 90% risk). Alternatively, the risk score may indicate that the environment may not be compromised or has a low likelihood of being compromised (e.g., 10% risk). The risk score may be provided as a fractional (e.g., 0.8) or percentage quantification (e.g., 80%) regarding the security risk of the environment.

At operation 316, a determination may be made regarding whether the likelihood (e.g., the risk score) exceeds a risk threshold. The determination may be made by comparing the risk score (e.g., the likelihood of compromising sensitive data) to a risk threshold. The risk threshold may be based on the level of sensitivity of the data (e.g., using lower risk thresholds for higher levels of sensitivity of data).

If the likelihood exceeds the risk threshold (e.g., the environment has a likelihood of being unsecure), the method may proceed to operation 320. However, if the likelihood does not exceed the risk threshold (e.g., the environment has a likelihood of being secure), the method may proceed to operation 318.

At operation 318, access to at least the sensitive data is securely provided to the user. The sensitive data may be securely provided to the user by encrypting the sensitive data and transmitting the encrypted sensitive data to the display system (or the requesting device).

A portion of a key pair may be used to encrypt the sensitive data. The portion of a first key pair associated with the user, the requesting device, the display device, and the environmental monitoring system (e.g., the sensing device) may be identified. The portion of the first key pair (e.g., established during the registration process) may be identified by accessing a key pair association database or a certificate.

The key pair database may associate identifiers of users, devices, and/or other information with keys for encrypting sensitive data. A key may be identified by performing a look-up in the key pair database based on information included in the data access request (e.g., identifying information regarding the requesting device, the display device associated with the requesting device, the user of the requesting device, and the sensing device associated with the display device). The portion of the first key pair may be a public key (e.g., a public key certificate).

The first key pair may be identified by matching an identifier of the display device to a stored certificate. The stored certificate may validate that a public key of the certificate is known to be part of a key pair (e.g., the first key pair) associated with the display device. For example, the certificate may include a public key and the display device may store the corresponding private key.

The sensitive data may be encrypted using the portion of the first key pair (e.g., the public key of the display device). For example, plaintext (e.g., the sensitive data and/or other data used as an ingest for an encryption algorithm) may be encrypted using the public key (e.g., as a cypher, or establishing a cypher) to obtain encrypted data. During encryption, plaintext may be converted to ciphertext (e.g., encrypted data), securing the plaintext from malicious parties as it may only be decrypted by a trusted device that has access to the corresponding private key (e.g., stored on the display device).

The encrypted data may be provided to the display device by transmitting the encrypted data (and/or unencrypted data) over a secure communication channel established between the data storage system and the display device (e.g., a transmission path that does not include the requesting device).

Alternatively, the data storage system may transmit the requested data (e.g., encrypted and/or unencrypted data) to the requesting device, where the data may not be decrypted. The requesting device may then transmit the requested data to the display device.

Once the requested data is received by the display device, the user may decrypt the encrypted portion of the requested data using the private key of the first key pair established during registration. The decryption may be automatic or may be an additional process that requires manual initiation by the user. Consequently, an additional layer of security for the sensitive data may be provided (e.g., malicious parties that have compromised the display device may not be able to decrypt the encrypted data unless the malicious party knows of the key pair and encryption process).

Once decrypted by the display system (e.g., display device), the sensitive data may be viewed on the display device (e.g., accessed) by the user but may not be accessible by the requesting device that typically displays content on the display device. By decrypting the sensitive data using the display device, the sensitive data may be screened from the requesting device (e.g., and any malicious party that may have access to the requesting device).

While the sensitive data is being accessed by the user, additional environmental checks may be performed (e.g., in real-time). The environmental check may generate a risk score using a trained inference model (e.g., as described with respect to operation 314). If the likelihood of sensitive data being compromised changes (e.g., the security likelihood of the environment changes), data access may be restored or restricted based on the updated risk score.

For example, if the security likelihood of the environment changes from secure to unsecure (e.g., crosses the risk threshold boundary), the display device may perform an obfuscation operation rendering the sensitive data temporarily inaccessible (e.g., by disabling the display system and/or by blurring the sensitive data). Alternatively, if the security likelihood of the environment changes from unsecure to secure, user access to the sensitive data may be restored (e.g., by re-enabling the display system and/or by de-blurring the sensitive data). Thus, access to sensitive data may be managed in real-time based on the real-time environmental security status, thereby preventing sensitive data access by unauthorized parties physically occupying the environment.

The method may end following operation 318.

Returning to operation 316, if the likelihood exceeds the risk threshold (e.g., the environment has a likelihood of being unsecure), the method may proceed to operation 320.

At operation 320, access to at least a portion of the sensitive data is prevented. Access may be prevented by modifying an access level of the user to reduce risk of unauthorized disclosure of the sensitive data. The modified access level may result in (i) denying access to the portion of the sensitive data, (ii) performing an obfuscation operation to render the portion of the sensitive data inaccessible. Access to the portion of the sensitive data may remain restricted while the access level remains modified. The access level may be modified based on updated risk scores generated in operation 314.

The method may end following operation 320.

Thus, as illustrated above, embodiments disclosed herein may provide systems and methods usable to manage access to data stored in data storage systems. By managing access to the data, the likelihood of malicious parties gaining access to sensitive data stored in data storage systems may be reduced. By registering user-device combinations through a registration system, cryptographic keys (e.g., key pairs) specific to the registered combinations (e.g., user, end device, display device, and sensing device) may be used to employ multiple layers of security.

As described, an access control system that includes user authentication, requesting device authentication, display device-based encryption (e.g., circumventing the requesting device), and real-time environmental security checks may be implemented. The environmental checks may be performed using trained inference models, allowing for the analysis of large amounts of sensing data and for real-time responses to environmental threats using security access level modification. The access control system may be implemented to prevent the exposure of sensitive data to remote malicious parties and/or malicious parties physically present in the data access environment.

Thus, embodiments disclosed herein may provide an improved computing device that is able to reduce the likelihood of a malicious party intercepting accessed sensitive data. Accordingly, the disclosed process provides for both an embodiment in computing technology and an improved method for managing secure data access.

Figure 4:
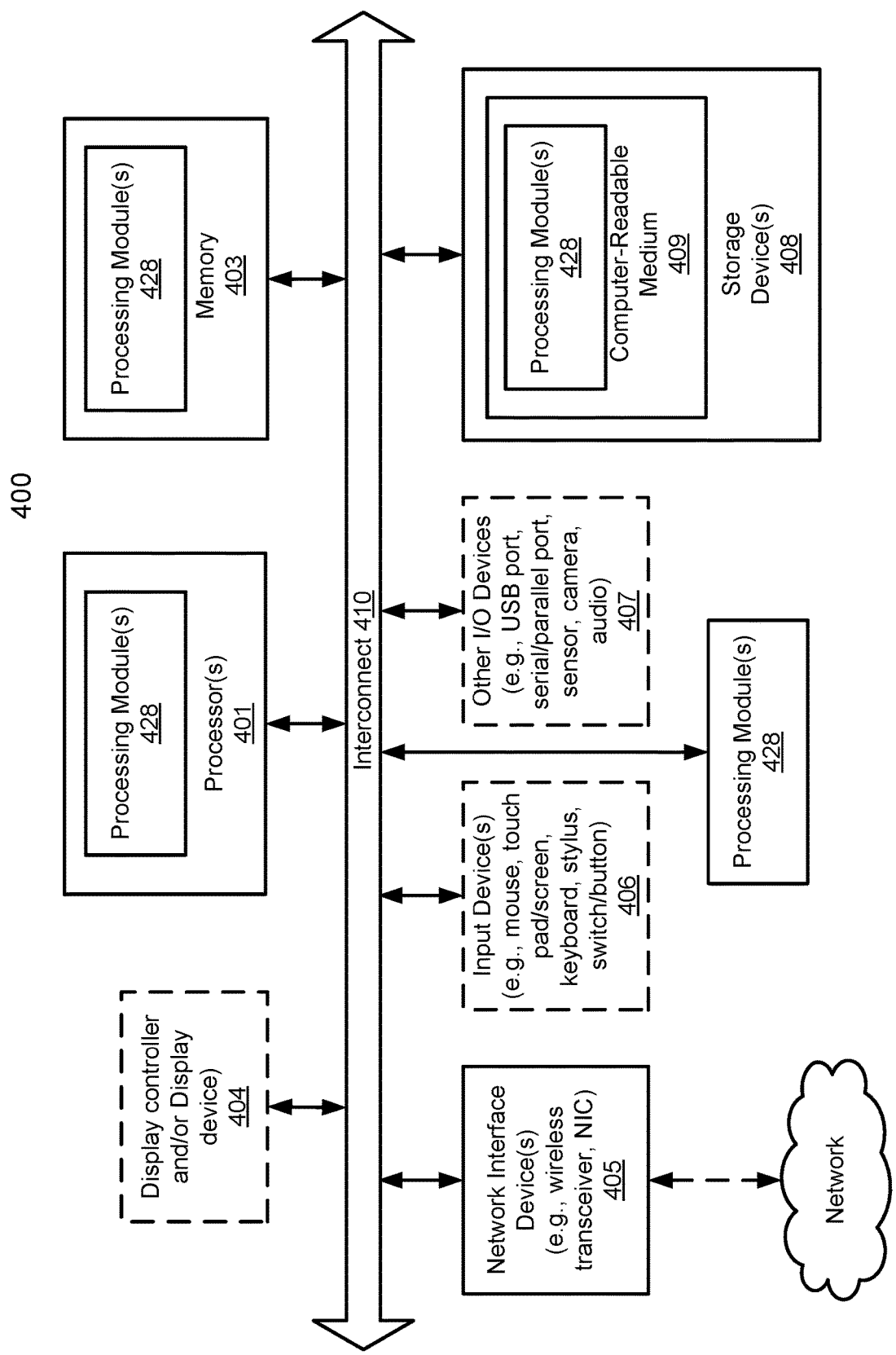
FIG. 4 shows a block diagram illustrating a data processing system in accordance with an embodiment.

Any of the components illustrated in FIGS. 1-2C may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high-level view of many components of the computer system. However, it is to be understood that additional components may be present in certain implementations and furthermore, different arrangement of the components shown may occur in other implementations.

System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-408 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like.

More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets.

Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random access memory (RAM), dynamic RAM (DRAM), synchronous DRAM (SDRAM), static RAM (SRAM), or other types of storage devices. Memory 403 may store information including sequences of instructions that are executed by processor 401, or any other device.

For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OSR/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid-state device (SSD). However, in other embodiments, the mass storage may primarily be implemented using a hard disk drive (HDD) with a smaller amount of SSD storage to act as an SSD cache to enable non-volatile storage of context state and other such information during power down events so that a fast power up can occur on re-initiation of system activities. Also, a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components, or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g., circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for managing access to data stored in a data storage system, comprising:
   obtaining a data access request for a portion of the data, the data access request being from a user located in an environment, and the data access request being obtained from a requesting device,
   the requesting device being used by the user;
   making a first determination regarding whether the requesting device and the user can be validated and that the portion of data comprises sensitive data; and
   in a first instance of the first determination where both the requesting device and the user are validated, and the portion of the data comprises the sensitive data:
   obtaining environmental data based on activity in the environment, the environment being monitored by an environmental monitoring system,
   ingesting the environmental data into a trained inference model to obtain an inference, the inference indicating a likelihood of the sensitive data being compromised due to the activity in the environment,
   making a second determination regarding whether the likelihood exceeds a risk threshold, and in a first instance of the second determination where the likelihood does not exceed the risk threshold:
   securely providing access to at least the sensitive data to a display system used by the user via an operable connection that bypasses the requesting device so that at least the sensitive data is inaccessible to the requesting device.

2. The method of claim 1, wherein obtaining the environmental data comprises:
   collecting environmental data using sensing devices of the environmental monitoring system, the environmental data comprising a type of data selected from a group of types of data consisting of audio data, video data, thermal data, and electromagnetic data.

3. The method of claim 2, wherein obtaining the environmental data further comprises:
   performing a verification procedure for a first sensing device of the environmental monitoring system, the verification procedure indicating whether the first sensing device is performing above an operational parameter; and
   in a first instance of the verification procedure where the first sensing device is not performing above the operation parameter:
   selecting, based on a degree of lack of performance by the first sensing device, an action to obtain the inference.

4. The method of claim 3, wherein when the degree of lack of performance exceeds a first threshold, the action comprises:
   utilizing a second sensing device to collect environmental data for ingestion to a second trained inference model.

5. The method of claim 4, wherein when the degree of lack of performance exceeds a second threshold and does not exceed the first threshold, the action comprises:
   selecting the trained inference model to generate the inference, the trained inference model being trained to compensate for the degree of lack of performance.

6. The method of claim 5, wherein the trained inference model is trained, using previously collected environmental data, to generate attribution scores regarding the inference, and the inference comprises a risk score.

7. The method of claim 6, wherein the attribution scores indicate a level of dependence of the inference on different portions of information regarding the activity in the environment that are ingested into the trained inference model to obtain the inference.

8. The method of claim 7, wherein the activity in the environment comprises at least one of presence of an unauthorized person in a portion of the environment monitored by the sensing devices, and absence of the user in the portion of the environment.

9. The method of claim 6, wherein the environmental monitoring system uses the sensing devices to record the environmental data, and the sensing devices comprising at least one sensing device selected from a group of sensing devices consisting of a camera, a microphone, and a proximity sensor.

10. The method of claim 1, further comprising:
    after the at least the sensitive data has been accessed by the user:
    ingesting into the trained inference model, a second environmental data based on new activity in the environment to obtain a second inference, the second inference indicating a second likelihood of the sensitive data being compromised due to the new activity in the environment, and
    in a first instance of the second inference where the second likelihood exceeds the risk threshold:
    performing an obfuscation operation rendering the sensitive data temporarily inaccessible.

11. The method of claim 10, wherein performing the obfuscation operation comprises disabling a display device that is displaying the sensitive data.

12. The method of claim 1, the display system being distinguishable from the requesting device and being usable by the user.

13. The method of claim 1, wherein the environmental monitoring system is distinct from the requesting device.

14. The method of claim 12, wherein the at least the portion of the requesting device comprises a component that is subject to compromise via malicious programs.

15. The method of claim 14, wherein the component is a processor.

16. The method of claim 12, wherein the operable connection bypasses all of the requesting device.

17. A non-transitory machine-readable medium having instructions stored therein, which when executed by a processor, cause the processor to perform operations for managing access to data stored in a data storage system, the operations comprising:
    obtaining a data access request for a portion of the data, the data access request being from a user located in an environment, and the data access request being obtained from a requesting device, the requesting device being used by the user;
    making a first determination regarding whether the requesting device and the user can be validated and that the portion of data comprises sensitive data; and
    in a first instance of the first determination where both the requesting device and the user are validated, and the portion of the data comprises the sensitive data:
    obtaining environmental data based on activity in the environment, the environment being monitored by an environmental monitoring system,
    ingesting the environmental data into a trained inference model to obtain an inference, the inference indicating a likelihood of the sensitive data being compromised due to the activity in the environment,
    making a second determination regarding whether the likelihood exceeds a risk threshold, and in a first instance of the second determination where the likelihood does not exceed the risk threshold:
    securely providing access to at least the sensitive data to a display system used by the user via an operable connection that bypasses the requesting device so that at least the sensitive data is inaccessible to the requesting device.

18. The non-transitory machine-readable medium of claim 17, wherein obtaining the environmental data comprises:
    collecting environmental data using sensing devices of the environmental monitoring system, the environmental data comprising a type of data selected from a group of types of data consisting of audio data, video data, thermal data, and electromagnetic data.

19. A data processing system, comprising:
    a processor; and
    a memory coupled to the processor to store instructions, which when executed by the processor, cause the processor to perform operations for managing access to data stored in a data storage system, the operations comprising:
    obtaining a data access request for a portion of the data, the data access request being from a user located in an environment, and the data access request being obtained from a requesting device, the requesting device being used by the user,
    making a first determination regarding whether the requesting device and the user can be validated and that the portion of data comprises sensitive data, and
    in a first instance of the first determination where both the requesting device and the user are validated, and the portion of the data comprises the sensitive data:
    obtaining environmental data based on activity in the environment, the environment being monitored by an environmental monitoring system;
    ingesting the environmental data into a trained inference model to obtain an inference, the inference indicating a likelihood of the sensitive data being compromised due to the activity in the environment;
    making a second determination regarding whether the likelihood exceeds a risk threshold; and
    in a first instance of the second determination where the likelihood does not exceed the risk threshold:
    securely providing access to at least the sensitive data to a display system used by the user via an operable connection that bypasses the requesting device so that at least the sensitive data is inaccessible to the requesting device.

20. The data processing system of claim 19, wherein obtaining the environmental data comprises:

collecting environmental data using sensing devices of the environmental monitoring system, the environmental data comprising a type of data selected from a group of types of data consisting of audio data, video data, thermal data, and electromagnetic data.

\* \* \* \* \*